(12) United States Patent
Makhoulian (10) Patent No.: US 10,035,527 B1
(45) Date of Patent: Jul. 31, 2018

(54) FOLD UP GOLF PULL CART

(71) Applicant: Paul B. Makhoulian, Novi, MI (US)

(72) Inventor: Paul B. Makhoulian, Novi, MI (US)

( * ) Notice: Subject to any disclaimer, the term of this patent is extended or adjusted under 35 U.S.C. 154(b) by 0 days.

(21) Appl. No.: 15/459,692

(22) Filed: Mar. 15, 2017

(51) Int. Cl.
| | |
|---|---|
| *B62B 1/26* | (2006.01) |
| *B62B 1/12* | (2006.01) |
| *B62B 1/04* | (2006.01) |
| *B62B 5/06* | (2006.01) |
| *B62B 1/00* | (2006.01) |
| *A63B 55/60* | (2015.01) |

(52) U.S. Cl.
CPC .............. *B62B 1/042* (2013.01); *B62B 1/008* (2013.01); *B62B 5/067* (2013.01); *A63B 55/60* (2015.10); *B62B 2202/404* (2013.01)

(58) Field of Classification Search
CPC ......................... A63B 55/60; B62B 2202/404
See application file for complete search history.

(56) References Cited

U.S. PATENT DOCUMENTS

| | | | | |
|---|---|---|---|---|
| 2,124,265 A * | 7/1938 | Sinnott | .................... | B62B 1/042 280/13 |
| 2,414,017 A * | 1/1947 | Carr | ........................ | B62B 1/042 248/96 |
| 2,563,033 A * | 8/1951 | Greig | ...................... | B62B 1/045 280/13 |
| 2,579,937 A * | 12/1951 | Larsen | .................... | B62B 1/042 280/13 |
| 2,619,360 A * | 11/1952 | Alter | ........................ | B62B 1/045 280/13 |
| 2,687,894 A * | 8/1954 | Stoddard | .................. | B62B 1/045 280/13 |
| 2,782,048 A * | 2/1957 | Williams | ................ | B62B 1/045 280/13 |
| 2,803,469 A * | 8/1957 | Pfisterer | .................. | B62B 1/042 280/13 |
| 2,825,574 A * | 3/1958 | Williamson | ............ | B62B 1/042 280/13 |
| 2,855,208 A * | 10/1958 | Abgarian | ................ | B62B 1/042 280/13 |
| 3,459,434 A * | 8/1969 | Dulaney | .................. | B62B 1/045 248/96 |
| 4,248,453 A * | 2/1981 | Stark | ........................ | B62B 1/125 16/18 R |
| 4,289,326 A * | 9/1981 | Hawkes | .................. | B62B 1/047 248/171 |
| 4,302,029 A * | 11/1981 | Albertson | ............... | B62B 1/042 248/435 |
| 4,792,152 A | 12/1988 | Carolan | | |
| 4,793,622 A * | 12/1988 | Sydlow | ................... | B62B 1/042 280/40 |
| 4,832,362 A * | 5/1989 | Chen | ........................ | B62B 1/12 280/47.26 |
| 4,887,835 A * | 12/1989 | Dallaire | .................. | B62B 1/047 280/646 |
| 5,112,068 A | 5/1992 | Liao et al. | | |
| 5,154,435 A * | 10/1992 | Chiu | ....................... | B62B 1/045 280/47.315 |

(Continued)

*Primary Examiner* — Paul N Dickson
*Assistant Examiner* — Vaughn Coolman
(74) *Attorney, Agent, or Firm* — John R. Benefiel (57) ABSTRACT

A fold up golf pull cart having sets of small diameter wheels mounted on each end of a cross bar so as to be able to be swung up in order to make the cart more compact for easy stowage on a motorized golf cart.

8 Claims, 7 Drawing Sheets

(56) References Cited

U.S. PATENT DOCUMENTS

| | | | | |
|---|---|---|---|---|
| 5,180,184 A * | 1/1993 | Chiu | | B62B 1/042 |
| | | | | 248/96 |
| 5,351,983 A * | 10/1994 | Descalo | | B62B 1/12 |
| | | | | 248/96 |
| 5,454,576 A | 10/1995 | Pitaknen | | |
| 5,570,764 A * | 11/1996 | Levin | | A45C 5/14 |
| | | | | 16/18 R |
| 5,632,496 A | 5/1997 | Nelson | | |
| 5,924,709 A * | 7/1999 | Yang | | B62B 5/0083 |
| | | | | 280/47.131 |
| 6,186,520 B1 | 2/2001 | Barten | | |
| 6,193,264 B1 * | 2/2001 | Seon | | B62B 1/047 |
| | | | | 280/47.17 |
| 6,550,790 B1 * | 4/2003 | Smeallie | | B62B 1/02 |
| | | | | 280/47.17 |
| 6,758,481 B2 | 7/2004 | Blomgren | | |
| 7,025,363 B1 * | 4/2006 | Leight | | B62B 1/10 |
| | | | | 280/47.131 |
| 7,114,730 B2 | 10/2006 | Cheldin | | |
| 7,137,644 B2 * | 11/2006 | Kimberley | | B62B 3/12 |
| | | | | 280/651 |
| 7,287,765 B2 | 10/2007 | Murphy et al. | | |
| 8,272,648 B2 | 9/2012 | Cassoni | | |
| 9,079,598 B1 * | 7/2015 | Oreyang | | B62B 3/022 |
| 9,346,478 B2 * | 5/2016 | Kimberley | | B62B 5/0433 |
| 2003/0234501 A1 * | 12/2003 | Cohen | | B62B 1/125 |
| | | | | 280/47.24 |
| 2004/0026897 A1 * | 2/2004 | Wu | | B62B 1/045 |
| | | | | 280/652 |
| 2006/0175782 A1 * | 8/2006 | Shin | | B62B 1/047 |
| | | | | 280/47.26 |
| 2007/0252353 A1 * | 11/2007 | Sokol | | A63B 55/60 |
| | | | | 280/47.26 |
| 2009/0079165 A1 * | 3/2009 | Liao | | B62B 1/045 |
| | | | | 280/646 |
| 2016/0185374 A1 * | 6/2016 | Zhang | | B62B 3/02 |
| | | | | 280/651 |

\* cited by examiner

FOLD UP GOLF PULL CART

BACKGROUND OF THE INVENTION

This invention concerns golf pull carts which are used to hold and transport a golf bag.

While golf pull carts are used to move a golfer's bag full of clubs around the course while playing a round, a common practice is to use the cart to carry the bag from a player's car to a motorized golf cart where the pull cart and bag are loaded onto the motorized cart.

It has heretofore been proposed to provide a fold up pull cart to enable easier storage of the golf pull cart on the motorized carts.

Such pull carts typically have two wheels which are required to be of a large enough diameter so as to easily traverse the grounds of a golf course.

However, the sizes of the wheels limits the degree of compactness of the folded up golf pull cart such that easily storable pull carts have not been available.

Such golf pull carts also typically have pull handles which have a tendency to be in the way when golf clubs are being retried and replaced.

It is an object of the present invention to provide a golf pull cart which have wheels which are configured to be folded into a small enough space so as to be easily stowable on a motorized golf cart.

It is a further object to provide a golf pull cart which can allow adjustments of a handle mounting so as to be able to be out of the way when stowed.

SUMMARY OF THE INVENTION

The above objects of the invention and other which will be appreciated by those skilled in the art are achieved by providing sets of wheels for supporting a pull golf cart which are configured so as to minimize the size of the folded up pull cart by substantially reducing their diameter while increasing their width so as to allow folding up to a maximum extent possible so as to enable easy rolling across the grounds of the golf course.

The pull handle is mounted to allow adjustability in height and angle with respect to the upper end of the cart to minimize its presence when stowed so as to be out of the way as much as possible when stowed, as well as to provide easier pulling of the cart.

Adjustable mounts for holding the bag on the pull cart are also provided.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, and particularly FIGS. 1-4, a golf pull cart 10 is shown on which a golf bag 12 is supported.

The golf pull cart 10 includes a main upright member 14 which can be comprised of an aluminum square tube extrusion. The upright member 14 has a bottom end attached to a cross member 16 having ends projecting out in either opposite directions from the bottom of the upright member 14.

Figure 1:
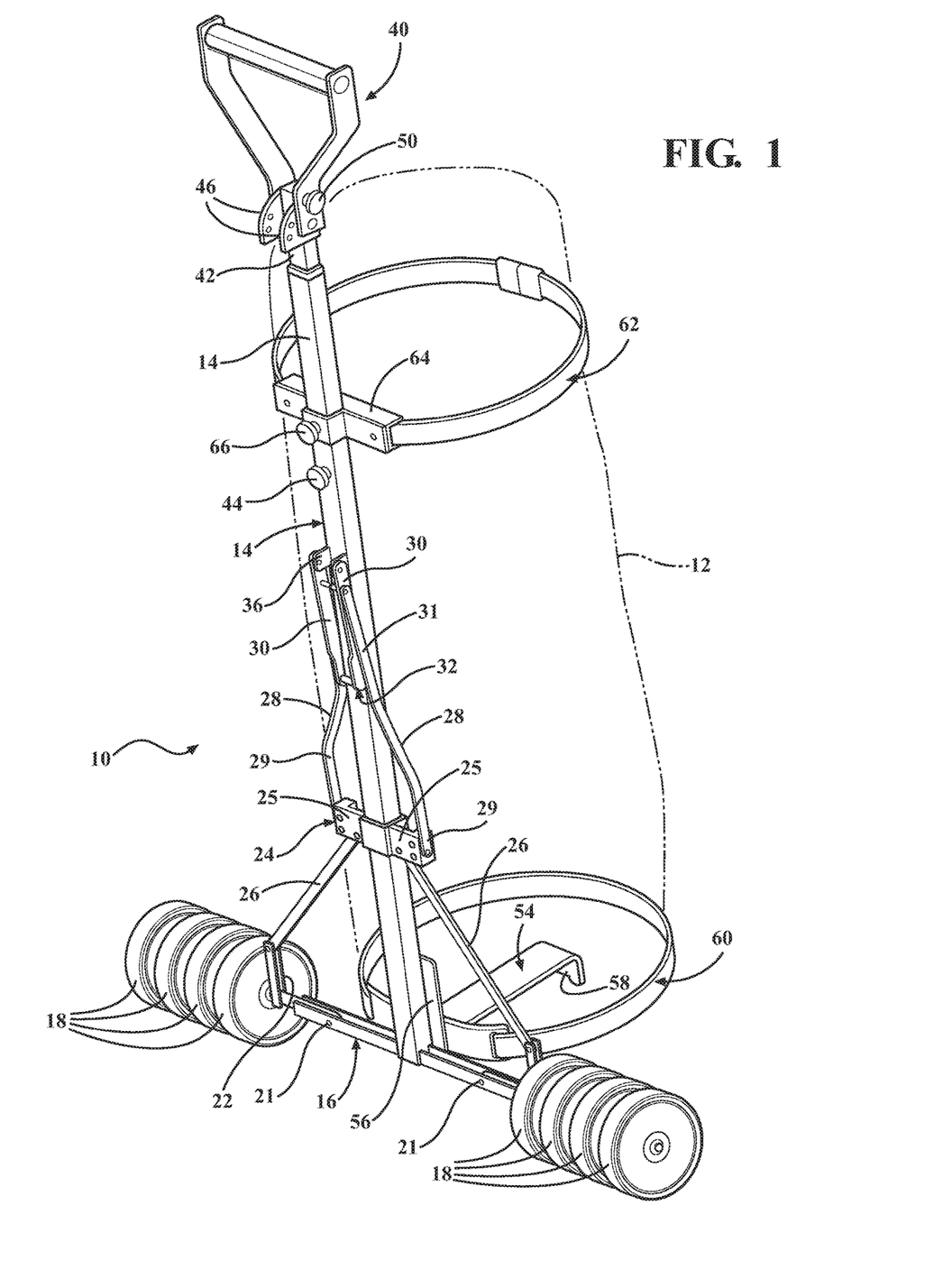
FIG. 1 is a pictorial view of a fold up golf pull cart according to the invention with an outline of a golf bag held thereon depicted in broken lines.
Figure 2:
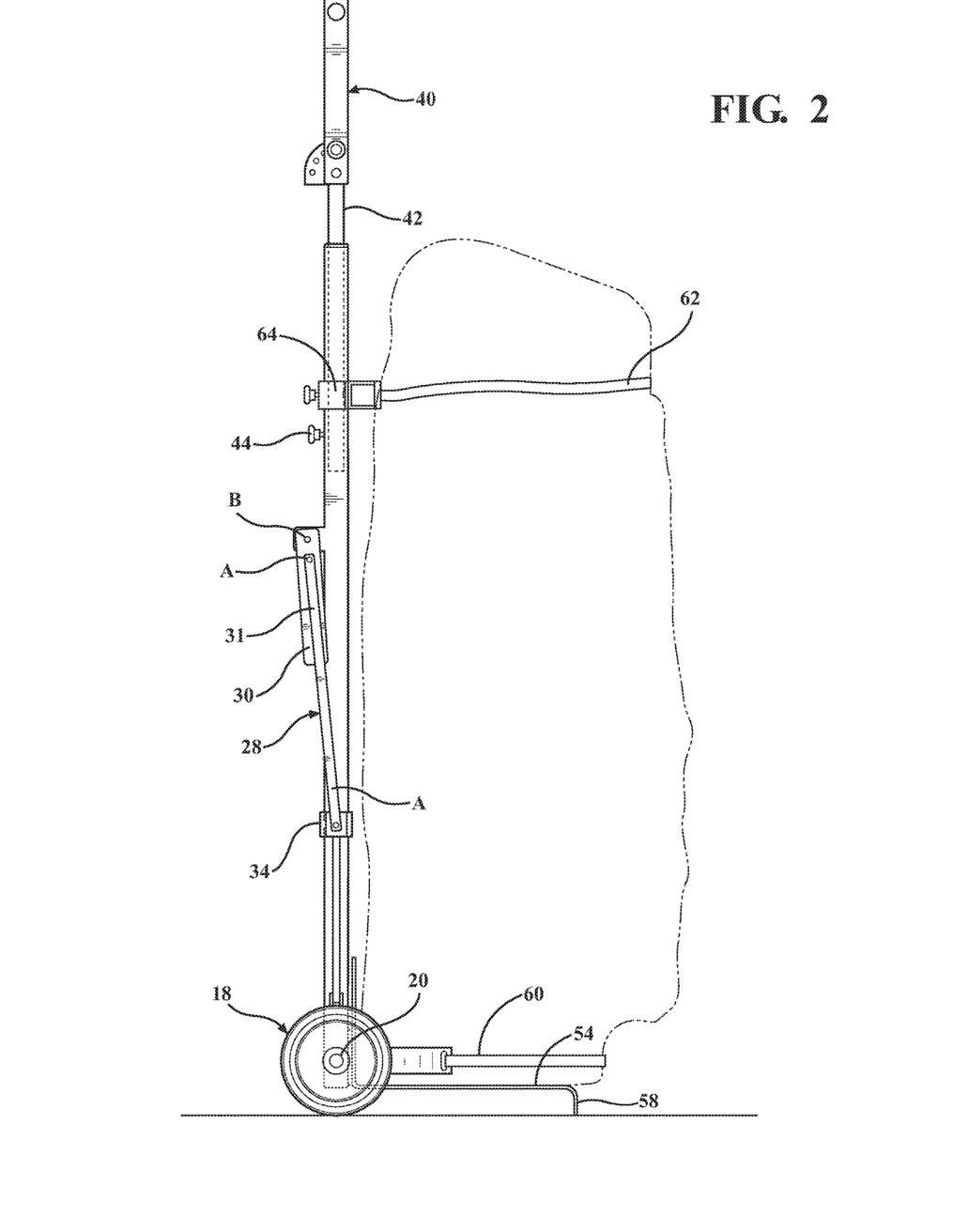
FIG. 2 is a side view of the golf pull cart shown in FIG. 1 with an outline of a golf bag held thereon depicted in broken lines.
Figure 3:
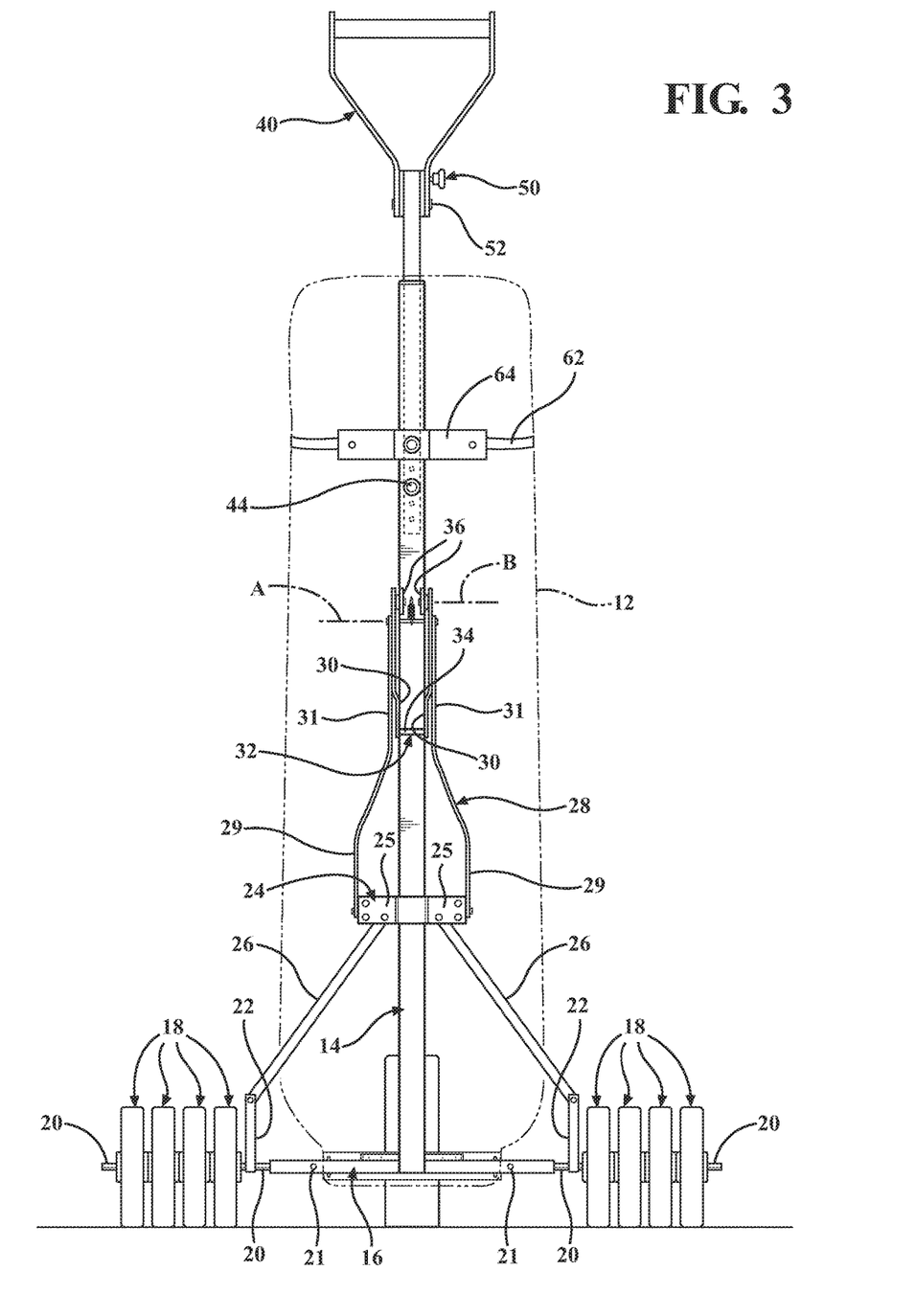
FIG. 3 is a rear view of the golf pull cart shown in FIGS. 1 and 2 with an outline of a golf bag held thereon depicted in broken lines.
Figure 4:
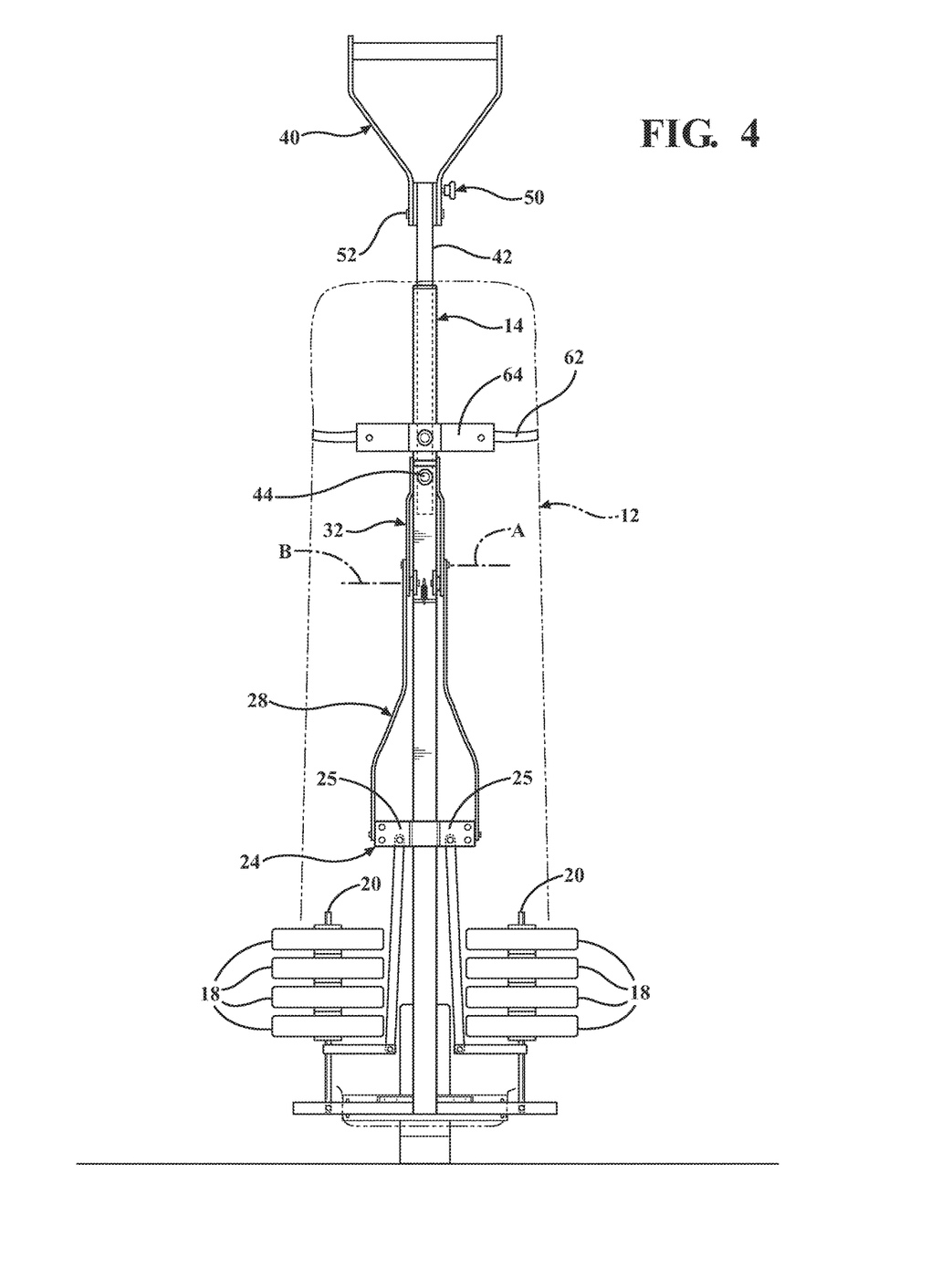
FIG. 4 is a rear view of the golf pull cart shown in FIGS. 1-3 with the supporting wheels pivoted up to prepare for stowage.

Sets of relatively small diameter wheels 18 are mounted separated from each other at either end of the upright cross members 16 by means of axle rods 20 extending through axis of the wheels 18 extending at right angles thereto. The axle rods 20 are also received within a respective end of the channel shaped cross member 16 and pinned at 21 thereto to allow the axle rods 20 and mounted wheels to be swung up when folding up the wheels 15 (FIG. 4).

As noted, the wheels 18 are of relatively small diameter, i.e., several inches or so less than 6 inches is preferable.

A slider 24 is slidably mounted on the upright member 14 to be moved up and down by movement of a double side piece flip handle 32.

Each axle rod 20 is affixed as by welding to a double link 22 so as to extending at right angles to a respective axle rod 20.

A pair of connector links 26 are each pivotally attached at one end to one side of a respective L shaped projection 25 of the slider 24 and at the other end to the free end of the respective double link 22.

A pair of elongated pull members 28 have their widely spaced lower ends 29 mounted to a respective end of a respective end projection 25 of the slider 24 and thin narrowly spaced upper ends 31 are pivoted to a respective side piece 30 of the flip handle 32. The free ends of the side pieces 30 are connected together with a tube 34 to form the handle 32.

The flip handle 32 is pivoted at its lower end (when the wheels 18 are lowered) to ears 36 fixed to a side of the upright member 14 at a pivot axis B.

The pivot axis A of the pull members 28 swings from a point below the B axis to an A location above the axis B. In so doing, it moves slightly "past center" as seen in FIG. 6.

Thus, the weight of the wheels 18 and various members and linkages tend to keep the handle 32 in its up position rather than to rotate back down. Such over center arrangements are well known in the mechanical arts.

Figure 6:
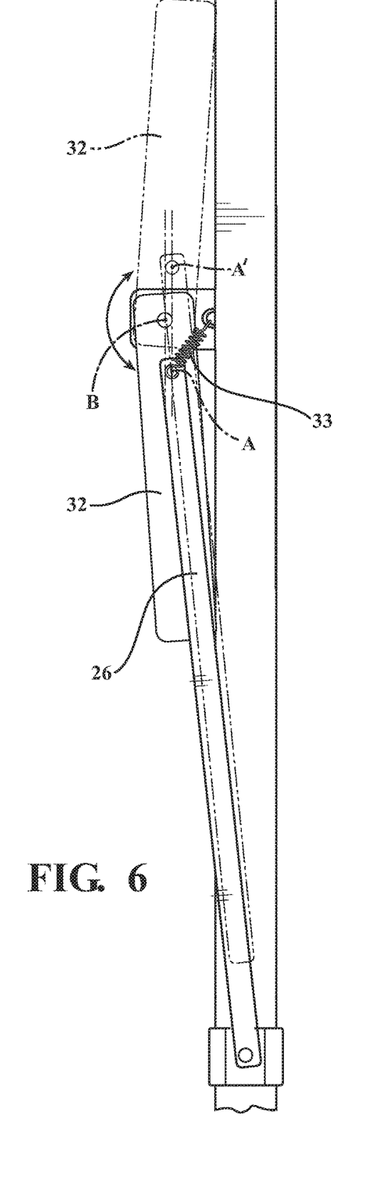
FIG. 6 is an enlarged fragmentary side view of the upper part of components of the golf pull cart according to the invention involved in pivoting up the wheels thereof with the location of the pivots of the component indicated to show a preferred over center position of a flip up handle to stabilize the wheels in either a folded up or down extended position.
Figure 7:
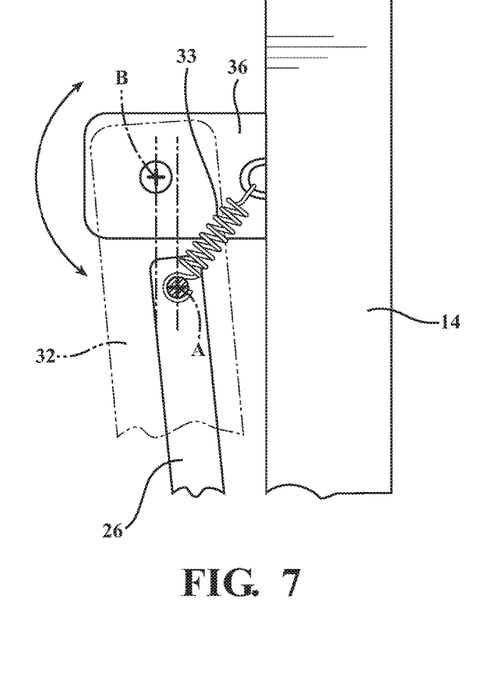
FIG. 7 is a further enlarged fragmentary view of the components shown in FIG. 6.

A bias spring 33 can also be included acting on the handle 32 to maintain it in both a swung up or swung down positions (FIG. 6).

As best seen in FIG. 4, the relatively small diameter of the wheels 18 in each wheel set allows substantially complete swinging of the axle rods 20 from a horizontal position up to a vertical position, with the lower width of the folded up bottom of the cart 10 being quite narrow, only slightly wider than the bag 10 itself to be compact and easily accommodated on a motorized golf cart stow space.

At the same time, using several wheels (shown as four) keeps the ground pressure exerted by the weight of the bag and cart low keeping them from sinking into wet or loose ground sometimes encountered when traversing golf course grounds, so that the pull cart will roll easily along any ground surface. Fewer wheels than four per set could be used or more than four depending on their diameter.

The wheels 18 in each set should be spaced apart sufficiently so that dirt does not pack into that space.

Figure 8:
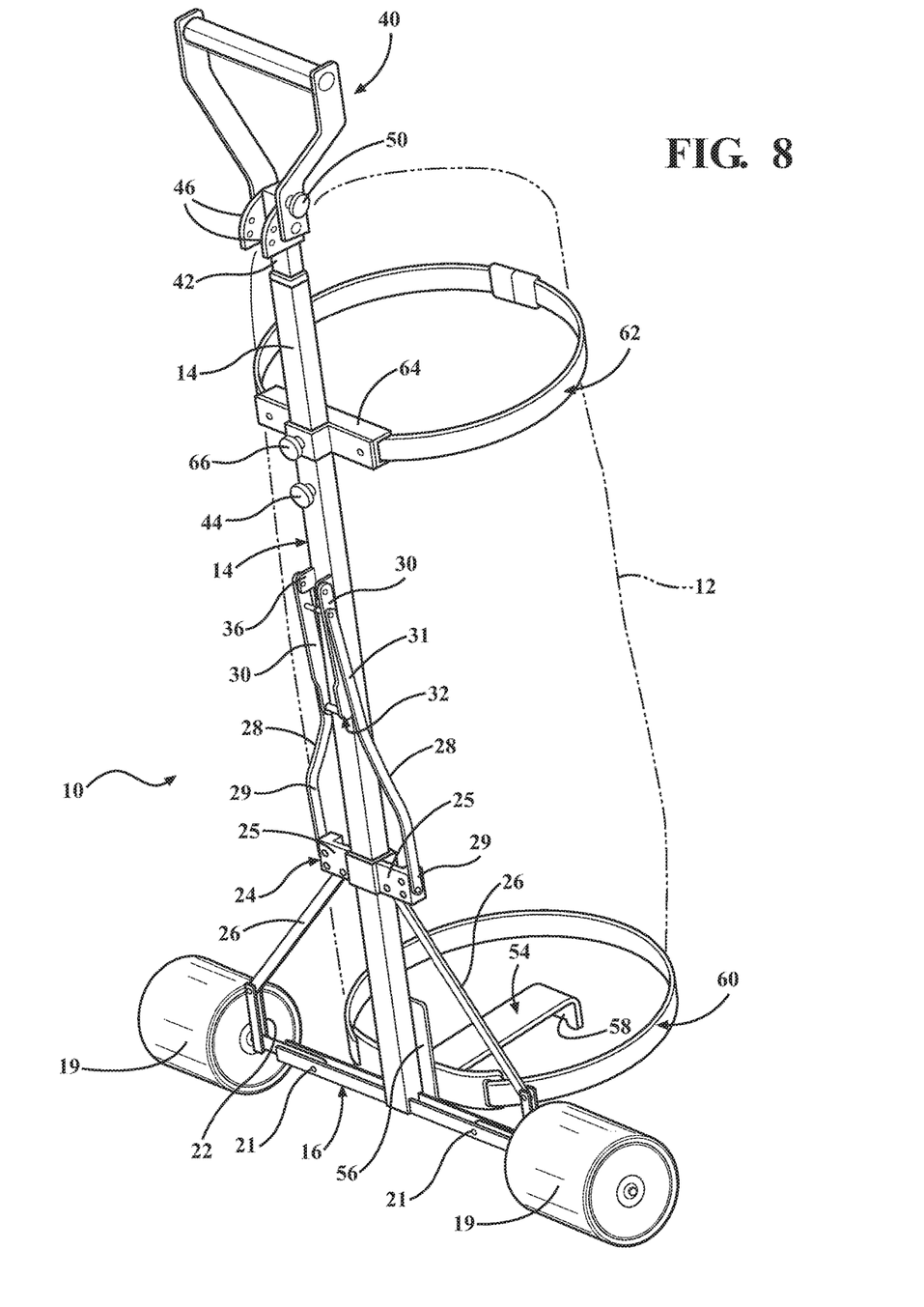
FIG. 8 is a pictorial view of another embodiment of a pull cart according to the invention.

Alternatively, a solid wide width roller 18A could be used as shown in FIG. 8, as long as the overall width of four inches is less than the wheel diameter to create a ground contact surface area great enough to roll easily on grass or dirt and not sink appreciably in normal soil conditions on a golf course.

The pull cart 10 further includes a pull handle 40 shown mounted to an elongated square tube member 42 slidable into the top of the square tube upright member 14 as indicated in FIG. 4 to conveniently enable a handle height adjustment to be made. A set screw 44 can be used to secure any selected adjustment in any of a series of holes 45 in the inner tube 42.

In addition, an angular adjustment is enabled by a pair of radiused plates 46 which are attached to the upper end of the tube 42 and which have a series of circumferentially spaced holes 48 formed therein along the outer perimeter therein.

Figure 5:
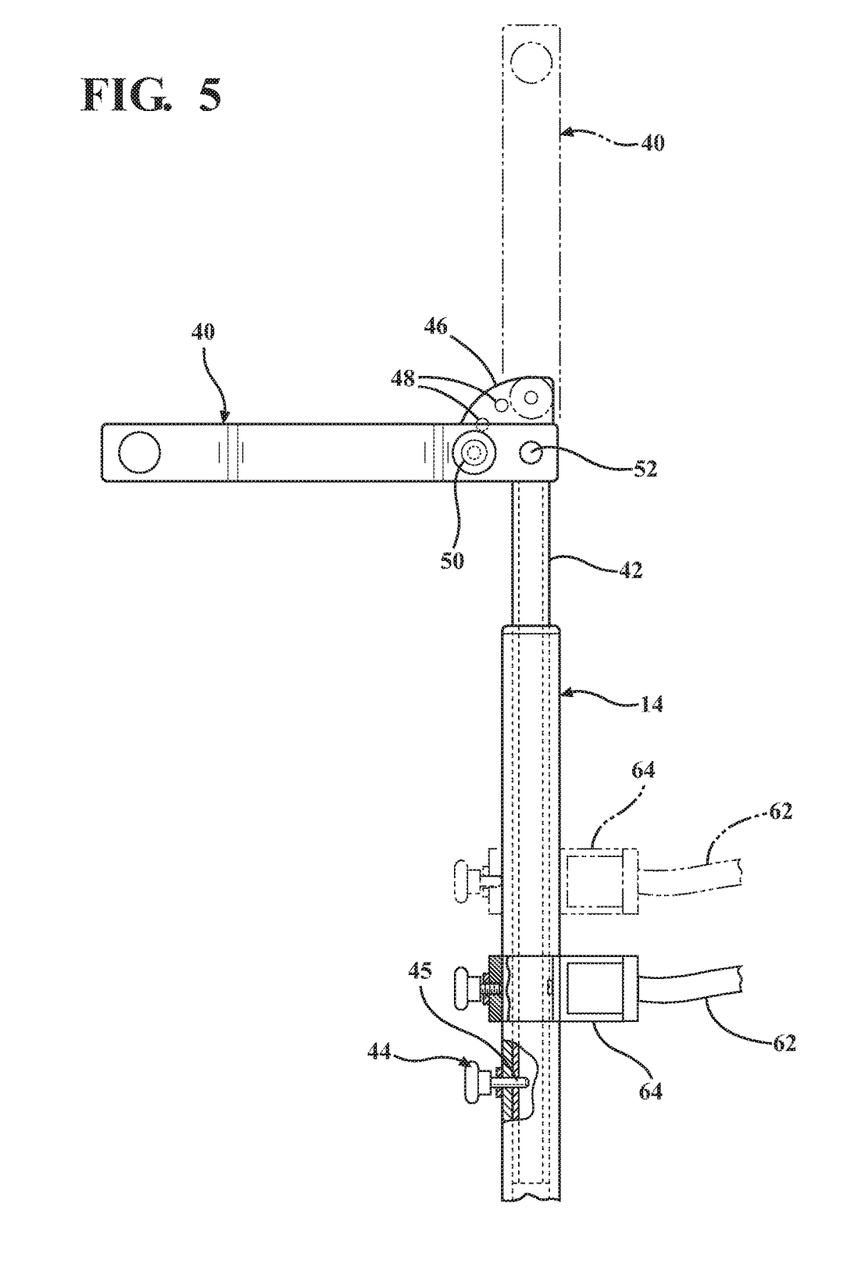
FIG. 5 is an enlarged fragmentary side view of upper portions of the golf pull cart shown in FIGS. 1-4 with adjustment of the handle and bag retainer straps depicted in broken lines.

The pull handle 40 is pivoted to the upper end of the tube 42 at a point which is at the center 52 of the arc along which the holes 48 are arranged (FIG. 5).

This allows the pull handle 40 to be pivoted and drawn down to be more out of the way when the pull cart 10 is not being used as a cart, but is merely holding the bag 12 and clubs stowed on a motorized cart.

The golf bag 12 rests on a fixed horizontal plate 54 fixed via a joining plate 56 attached to the upright member 14 to project horizontally therefrom. The plate 54 has a down-turned edge 58 which engages a supporting ground surface, the weight of the bag 12 and clubs, (not shown) tending to tip forwardly about the wheel axis, which is in turn resisted by the engagement of the edge 58 so as to stabilize the cart in its upright position.

A lower holder retainer strap 60 (FIG. 1) encircles the bottom of the bag 12 to hold it on the plate 54. Some adjustment of the strap 60 may be provided in an conventional manner.

An upper retainer strap 62 encircles the golf bag 12 at its upper level. A vertical adjustment is afforded by a bracket 64 which is slidable on the upright member 14 and a set screw 66 holds the same in any adjusted position.

Thus, the golf pull cart 10 can quickly be folded up to have a much more compact bottom end size with a minimum of obstructing features to be easily stowable on a auto trunk or hatchback space, or on a motorized golf car but is readily reconfigured for regular use after being removed from an automobile or motorized golf cart.

The invention claimed is:

1. A fold up golf pull cart for carrying a golf bag having golf clubs therein comprising:
   an upright member having a pull handle provided at the top able to be gripped by a user when pulling the cart;
   one or more wheels mounted to each respective end of a cross bar connected at its middle to a lower end of said upright member;
   an axle rod projecting out from each respective of said cross bar and extending through said one or more respective wheels mounted thereon, each axle rod having a portion extending along a respective end of said cross bar, each axle rod portion pivoted to said cross bar to enable being swung up therefrom;
   a slider mounted on said upright member so as to able to slide up and down thereon;
   a flip handle having one end connected by a pivotal connection to said upright member allowing said handle to be flipped up from a lowered position to a raised position;
   a linkage pivotally connected to each of said axle rods and to said slider; and,
   a slider connector comprised of two pieces each connected to a respective side of said slider at one end thereof and having a pivot connection to said flip handle at a location below said flip handle pivotal connection when said flip handle is in said lowered position, whereby when said flip handle is flipped up to an said raised position, said wheels are swung up by pivoting of said axle rods to a position nearer said upright member to substantially reduce the distance across said wheels to enable easier fitting into a storage space.

2. The fold up golf pull cart according to claim 1 wherein each of said one or more wheels comprises a set of two or more individual wheels mounted together in a side by side relationship.

3. The fold up golf pull cart according to claim 2 wherein wheels in each set of wheels are spaced apart from each other.

4. The fold up golf pull cart according to claim 2 wherein each wheel set includes more than two wheels.

5. The fold up golf pull cart according to claim 2 wherein:
   each set of wheels are of an axial width that is greater than a diameter of said wheels in each of said sets.

6. The fold up golf pull cart according to claim 1 wherein said pull handle is able to be moveable up and down by an elongate member connected to said handle and slidably received in said upright member and secured in any up or down position by tightening of a set screw on said upright member.

7. The fold up golf pull cart according to claim 1 wherein an inclination of said pull handle is able to be adjusted by rotation on said upright member with a set screw securing said pull handle in several adjusted positions.

8. The fold up golf pull cart according to claim 1 wherein each of said wheels is of a diameter smaller than the axial width thereof.

* * * * *